United States Patent

Chambers

[15] 3,659,782
[45] May 2, 1972

[54] LATCH-ON TEMPERATURE CONTROL SYSTEM

[72] Inventor: William W. Chambers, Anaheim, Calif.
[73] Assignee: Robertshaw Controls Company, Richmond, Va.
[22] Filed: Aug. 19, 1970
[21] Appl. No.: 65,218

[52] U.S. Cl..............................236/68 B, 219/511, 307/310
[51] Int. Cl. .......................................................G05d 23/24
[58] Field of Search........................236/68 B; 219/511, 499; 317/148.5 B, 132; 337/377; 338/22, 23; 307/252 P, 310

[56] References Cited

UNITED STATES PATENTS

| | | | |
|---|---|---|---|
| 3,563,681 | 2/1971 | Hirsbrunner | 431/66 |
| 3,211,214 | 10/1965 | Chambers | 219/499 X |
| 2,556,973 | 6/1951 | Nickells | 236/68 X |
| 2,425,998 | 8/1947 | Crise | 236/68 B X |
| 2,640,649 | 6/1953 | Rusler | 236/68 B X |

*Primary Examiner*—William E. Wayner
*Attorney*—Fulwider, Patton, Rieber, Lee & Utecht

[57] ABSTRACT

A latch-on temperature control system including a load for operating a heating unit to heat a media. A gate controlled conduction device is provided for controlling current flow through the load. A sensor is provided for sensing the temperature of the media and is connected in circuit with the load and with the gate of the conduction device. A feedback heater is connected in circuit with the conduction device and is disposed in heat exchange relationship with the sensor. A mechanical heat shield is interposed between the sensor and the feedback heater for delaying heat transfer from the heater to the sensor whereby when the temperature of the media drops below a predetermined temperature a triggering signal will be imposed on the gate of the conduction device to initiate current flow through the load and through the feedback heater thereby actuating the heating unit and, concurrently, decreasing the rate of current flow in the sensor resulting in a decrease in its self-heating to enhance the triggering signal and latch the conduction device in its conductive state. After a selected period of time the heat shield will be heated sufficiently to conduct sufficient heat to the sensor to heat such sensor sufficiently to substantially compensate for its decrease in self-heating resulting from energization of the load.

6 Claims, 5 Drawing Figures

Patented May 2, 1972
3,659,782
FIG.1
FIG.2
FIG.3
FIG.4
FIG.5
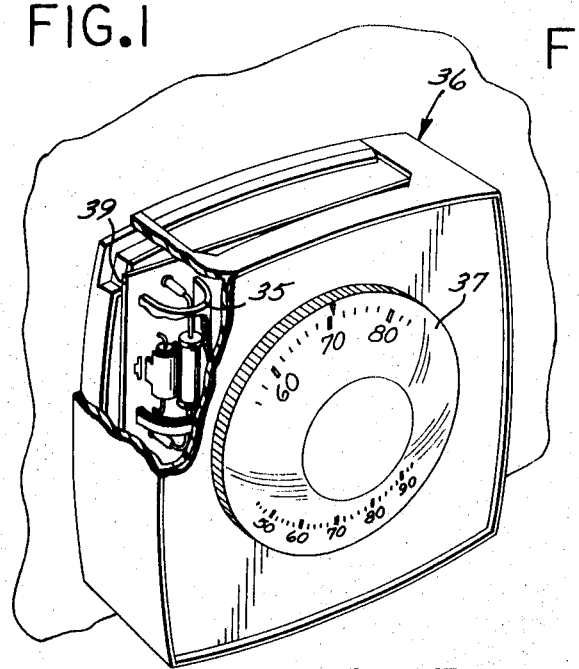
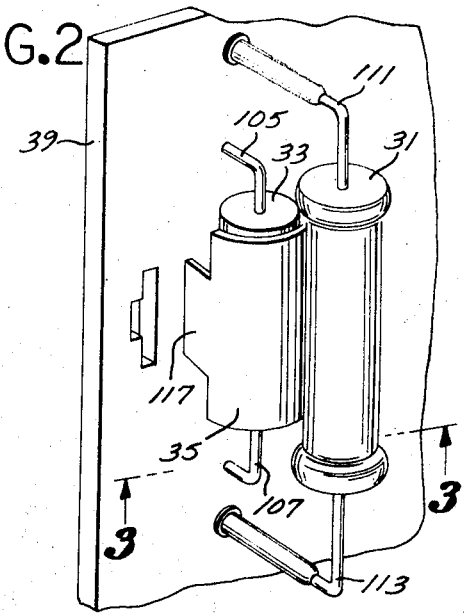
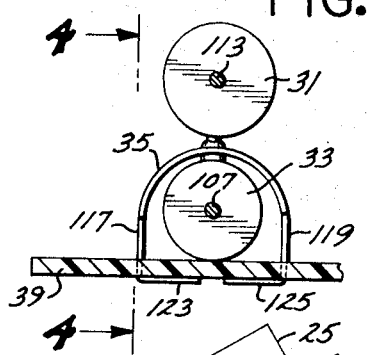
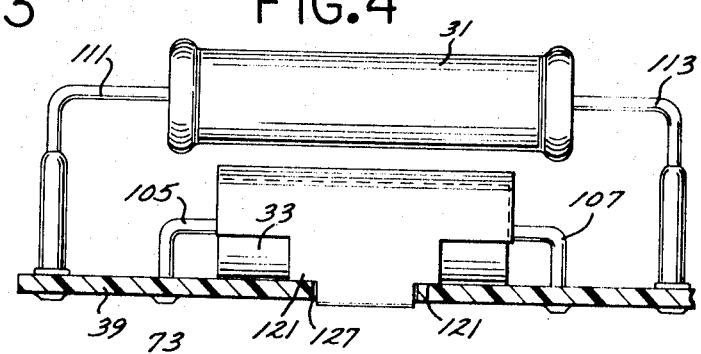
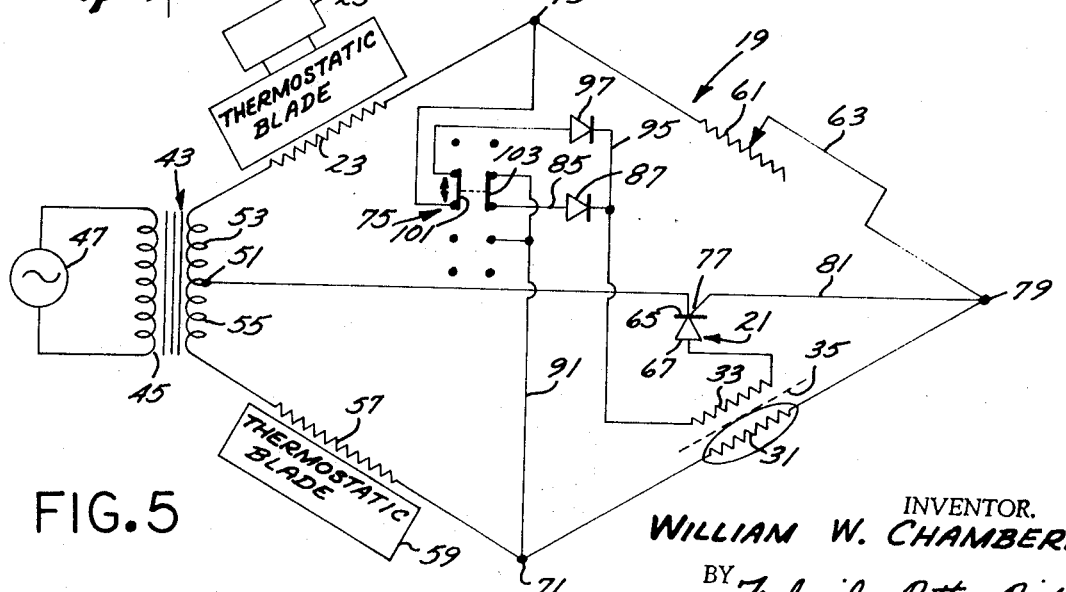
INVENTOR.
WILLIAM W. CHAMBERS
BY Fulwider, Patton Rieber, Lee and Utecht
ATTORNEYS

LATCH-ON TEMPERATURE CONTROL SYSTEM

BACKGROUND OF THE INVENTION

1. Field of the Invention

The latch-on temperature control system of present invention relates to devices for controlling temperature of a media or the like.

2. Description of the Prior Art

It has become common practice to employ a temperature responsive circuit which includes a resistor having a negative temperature coefficient, commonly referred to as a thermistor, for sensing the temperature of an environment to trigger a conduction device to actuate a heating unit. In circuits of this type, when the conduction device is in its nonconductive state, a relatively small amount of current flows through the sensor thereby producing some self-heating thereof and when the conduction device is triggered to commence current flow through the operator, the current flow rate through the sensor is reduced thereby decreasing the self-heating effect in such sensor. Such decrease in self-heating is highly beneficial since the sensor is immediately cooled below the temperature at which the conduction device is triggered thereby latching such conduction device in its conductive state to thereby positively prevent short cycling of such device between its conductive and nonconductive states.

However, the decrease in self-heating presents a false indication that the media being sensed is at a lower temperature than its actual temperature thereby resulting in the media being heated above the target temperature sufficiently far to compensate for the self-heating effect before the conduction device is again rendered nonconductive to discontinue heating of such media. To solve this problem of overshoot, feedback heaters have been provided in heat exchange relationship with the sensor and in circuit with the conductive device for heating the sensor sufficiently to compensate for the loss in self-heating and assure triggering of the conduction device when the media is heated to the target temperature.

Unfortunately, introduction of the feedback heater destroys, or harmfully diminishes, the latch-on effect produced by the reduction in self-heating upon initiation of conduction through the load when the conduction device is triggered. In order to solve this dilemma, applicant has discovered that a mechanical heat shield can be interposed between the sensor and feedback heater to delay heating of the sensor for a sufficient period of time after conduction through the load has been initiated to enable the loss in self-heating of the sensor to maintain the conduction device triggered to prevent short cycling. However, after a selected period of time the heat shield will become sufficiently heated to heat the sensor sufficiently to compensate for the above-referred-to loss in self-heating so the conduction device will be rendered nonconductive as soon as the media is heated to the target temperature thereby preventing any appreciable overshoot.

SUMMARY OF THE INVENTION

The latch-on temperature control system of present invention is characterized by a conduction device connected with a load and having its gate connected with a temperature sensor. A feedback heater is connected with the conduction device and is disposed in heat exchange relationship with the sensor. A mechanical heat shield is interposed between the heater and the sensor whereby when the conduction device is initially rendered conductive, current flow through the sensor will be reduced thereby reducing the self-heating of such sensor and latching the conduction device in its conductive state to prevent short cycling thereof. However, after a short period of time, the heat shield will be heated sufficiently by the heater to heat the sensor sufficiently to compensate for the loss in self-heating so the conduction device will be rendered nonconductive as soon as the media is heated to the target temperature.

An object of the present invention is to provide a latch-on temperature control system of the type described which includes a conduction device that is latched in its conductive state as soon as conduction is initiated but which will be rendered nonconductive as soon as the media is heated to the target temperature.

Other objects and the advantages of the present invention will become apparent from a consideration of the following detailed description when taken in conjunction with the accompanying drawing.

DESCRIPTION OF THE DRAWING

FIG. 1 is a perspective view, partially broken away, of a thermostat embodying the latch-on temperature control system of present invention;

FIG. 2 is a detail perspective view, in enlarged scale, of a portion of the thermostat shown in FIG. 1;

FIG. 3 is a horizontal sectional view taken along the line 3—3 of FIG. 2;

FIG. 4 is a vertical sectional view taken along the line 4—4 of FIG. 2; and

FIG. 5 is a schematic of an electrical circuit which may be incorporated in the thermostat shown in FIG. 1.

DESCRIPTION OF THE PREFERRED EMBODIMENT

Referring to FIGS. 1 and 5, the latch-on temperature control system of present invention includes, generally, a temperature responsive bridge circuit 19 including a gate controlled conduction device in the form of a silicon controlled rectifier (SCR) for controlling current flow through a resistance load 23 which may be utilized to operate a heating unit 25 for heating an environment. A sensor in the form of a negative temperature coefficient resistor 31 is provided for sensing the environment and is connected with the SCR 21 for delivering a triggering current thereto. A feedback resistance heater 33 is also connected with the SCR 21 and is disposed in heat exchange relationship with the sensor 31. An aluminum heat shield 35 is interposed between the sensor 31 and the heater 33 for delaying heat transfer therebetween. Consequently, when the environment is cooled below the target temperature, the resistance of the sensor 31 will be increased sufficiently to unbalance the circuit 19 and impose a triggering signal on the gate of the SCR 21 to thereby initiate current flow through the resistance load 23 to actuate the heating unit 25 and also initiate current flow through the feedback heater 33 to commence heating of the heat shield 35. Initiation of current flow through the resistance load 23 decreases the rate of current flow through the sensor 31 thereby decreasing the self-heating effect resulting from current flow therethrough. Consequently, the bridge 19 will become even further unbalanced to positively latch the SCR 21 in its conductive state. However, the feedback heater 33 will continue heating the heat shield 35 until sufficient heat is conducted to the thermistor 31 to totally compensate for the above-described loss in self-heating. Consequently, when the heating unit 25 has delivered sufficient heat to the environment to heat the thermistor 31 to the target temperature, the bridge 19 will again be balanced to render the conduction device 21 nonconductive and discontinue operation of such heating unit.

The latch-on control system of present invention may conveniently be utilized in a wall thermostat, generally designated 36, which includes a selector dial 37 for selecting the desired temperature. The thermostat 35 includes a sub-base 39 which has the bridge circuit 19 mounted thereon.

The bridge circuit 19 includes, generally, a secondary coil 43 which is disposed in inductive relationship with a primary coil 45 connected with an alternating current source 47. The secondary coil 43 is center tapped at 51 to form upper and lower coil halves 53 and 55, respectively. The coil half 53 and resistance load 23 cooperate to form one leg of the bridge 19 and the thermistor 31 forms a second leg. A third leg is formed by the primary coil half 55 and a resistance load 57 which heats a thermostatic blade 59 controlling an air conditioning unit (not shown). An adjustable resistor 61 forms the fourth leg of the bridge 19 and has its wiper 63 coupled with the thermostat selector dial 37.

The power circuit of the SCR 21 is formed by a cathode 65 which is connected to the center tap 51 and an anode 67 which is connected to the nodes 71 and 73 on opposite sides of the bridge 19 by means of a switch, generally designated 75. The gate 77 of the SCR 21 is connected with the fourth node 79 of the bridge 19 by means of a lead 81.

The anode 67 of the SCR 21 is connected with the bridge node 71 by means of a lead 85 which includes a current blocking diode 87, the lower contacts of the switch 75 and a lead 91. The anode 67 is connected with the bridge node 73 by means of a lead 95 including a diode 97 and through the upper contacts of the switch 75.

The switch 75 includes a pair of elongated sliding contacts 101 and 103 which are shown in position where the contact 101 completes a circuit from the bridge node 73 through the diode 97 and to the bridge anode 67. The sliding contact 103 completes a circuit from the cooling bridge node 71 through the cooling diode 87 and to the SCR anode 67. Consequently, in the arrangement shown, the temperature control system will automatically change over from heating to cooling or from cooling to heating as the demand therefor is sensed by the thermistor 31.

Referring to FIGS. 2, 3 and 4, the heating resistor 33 includes a pair of leads 105 and 107 at opposite ends and such leads are bent downwardly and project through bores in the sub-base 39 and are connected on their lower extremities with the circuitry 19 printed on the bottom of the sub-base 39.

Referring to FIGS. 2 and 4, the thermistor 31 includes a pair of leads 111 and 113 projecting from its opposite ends and bent downwardly to project through bores formed in the sub-base 39 and to connect on their lower extremities with the printed bridge circuitry 19.

The heat shield 35 is made from aluminum sheet and is semi-cylindrically shaped and formed on its opposite extremities with legs 117 and 119 extending parallel to one another and reduced in width on their lower extremities to form downwardly facing shoulders 121 and respective fastening tabs 123 and 125 which extend through slots 127 formed in the sub-base and are bent inwardly as shown in FIG. 3 to secure such shield in position.

Referring to FIG. 1, a guard 131 is installed in covering position over both the thermistor 31 and heating resistor 33 to guard the thermistor 31 from being accidentally bumped and the supporting leads 111 and 113 bent thereby altering the spacing between such thermistor and the heat shield 35.

In operation, the selector dial 37 is set at the temperature desired for the environment to be heated by the heater 25 and as long as the temperature of such environment remains at such selected temperature, the bridge 19 will remain balanced thereby maintaining substantially the same potential at the nodes 51 and 79 and maintaining the current in the gate lead 81 below the SCR triggering level. While the SCR remains nonconductive a small amount of current will flow through the thermistor 31 thereby producing some self-heating thereof. The bridge 19 is calibrated to compensate for such self-heating so the SCR 21 will be triggered as soon as the media cools to the target temperature.

When the temperature of the environment falls below the selected temperature, the thermistor 31 will be cooled to increase its resistance and unbalance the bridge 19. Consequently, when the top end of the secondary coil 43 is positive with respect to the bottom end, the bridge node 79 will be positive with respect to the bridge node 51 and also with respect to the bridge node 71. As the thermistor 31 is cooled further, the node 79 will become sufficiently positive with respect to the node 51 to render the SCR gate 77 sufficiently positive with respect to the cathode 65 to provide a triggering signal on such gate to trigger the SCR 21. Concurrently, the potential at the node 73 will be communicated through the diode 97 to the anode 67 and, since the SCR 21 is in its conductive state a circuit will be completed through the resistor 23 to commence heating of the thermostatic blade controlling the heating unit 25. On the subsequent half cycle when the top end of the secondary coil 43 is negative with respect to the bottom end, the node 79 will be negative thereby back-biasing the gate 77 and preventing triggering of the SCR 21. However, on the next half cycle, and each alternate half cycle thereafter, the SCR 21 will again be triggered.

During the half cycle when the SCR 21 is in its conductive state providing for current flow through the resistor 23, the normal current flow rate through the thermistor 31 will be reduced thereby reducing the self-heating thereof and enabling such thermistor to cool further below the selected media temperature and further increasing its resistance to enhance the unbalance of the bridge circuit 19 to positively maintain the SCR triggered to prevent its cycling from its conductive to its nonconductive state and then back to its conductive state to thereby provide for relatively rapid heating of the heater 23 to provide for rapid actuation of the heating unit 25. The avoidance of short-cycling is particularly important when the bridge circuit 19 is utilized to control a solinoid or other device which may be damaged thereby.

As current conduction continues through the SCR 21 and through the feedback heating resistor 33 such resistor will be heated but heating of the thermistor 31 will be delayed by the heat shield blocking radiant heating and delaying conductive heating while such shield is itself heated. After a couple of minutes, the heat shield 35 will become sufficiently heated to conduct sufficient heat to the thermistor 31 to heat such thermistor sufficiently to compensate for the loss in self-heating which resulted when the load 23 was energized thereby readying such thermistor to respond to such media being heated to the target temperature to thereby rebalance the bridge 19 and discontinue operation of the heating unit 25 to thereby avoid heating the media above such target temperature.

When the media has been heated sufficiently to heat the thermistor 31 and rebalance the bridge 19, the SCR 21 will be rendered nonconductive and current flow will be discontinued through the feedback resistor 33 and through the load 23 thereby discontinuing the heating effect of such resistor 33 and increasing the current flow rate through the thermistor 31 to reestablish its normal self-heating effect.

When the temperature of the media exceeds the target temperature and heats the thermistor 31 sufficiently to unbalance the bridge circuit 19 and when the bottom end of the secondary coil 43 is positive with respect to the top end, the node 79 will be positive with respect to the node 51 thereby imposing a triggering signal on the gate 77. Concurrently, the node 71 will be positive with respect to the node 51 thereby imposing a positive potential on the anode 67 with respect to the cathode 65 to initiate conduction through such SCR 21 and through the cooling resistor 57 thereby commencing heating of the thermostatic blade 59 to initiate operation of the air conditioning unit (not shown).

From the foregoing it will be apparent that the latch-on temperature control system of present invention provides a convenient means for positively energizing a heating unit when a media temperature drops below a target temperature and for maintaining such heating unit operative until the media is heated to its target temperature. When the media is heated to the target temperature, the heating unit will be deenergized immediately.

Various modifications and changes may be made with regard to the foregoing detailed description without departing from the spirit of the invention.

I claim:
1. A latch-on temperature control system comprising:
a load for operating a heating unit to heat a media;
a gate controlled conduction device for controlling current flow through said load;
a sensor in the form of a temperature responsive resistor for sensing the temperature of said media and connected in circuit with said load and the gate of said conduction device;

a feedback heating resistor in circuit with said conduction device and disposed in heat exchange relationship with said sensor; and a mechanical heat shield interposed between the sensor and feedback heating resistor for resisting heat transfer from said feedback heating resistor to said sensor whereby cooling of the temperature of said media causing the temperature of said sensor to cool below a predetermined temperature will produce a triggering signal on said gate to render said conduction device conductive to commence current flow through said load and through said feedback heater thereby decreasing the rate of the current flow in said sensor resulting in a decrease in its self-heating to enhance said triggering signal to latch said conduction device in its conductive state and, after a selected period of time, said heat shield will be heated sufficiently to conduct sufficient heat from said feedback heating resistor to said sensor to thereby heat said sensor sufficiently to substantially compensate for the decrease in self-heating to ready said sensor to be heated by said media to thereby control the media temperature from overshooting said selected temperature.

2. A latch-on temperature control system as set forth in claim 1 that includes:

a thermostat housing;

wherein said resistor includes a pair of leads mounting said resistor from said housing; and said sensor includes a pair of leads mounting said resistor from said housing and for maintaining said sensor in spaced relationship with respect to said shield and resistor.

3. A latch-on temperature control system as set forth in claim 1 that includes:

a thermostat housing;

wherein said resistor is mounted on said housing; and said shield is cylindrically shaped and is arranged to surround the side of said resistor adjacent said sensor.

4. A latch-on temperature control system as set forth in claim 1 wherein:

said shield is in the form of a metallic sheet.

5. A latch-on temperature control system as set forth in claim 2 wherein:

said shield is in the form of a metallic sheet.

6. A latch-on temperature control system as set forth in claim 3 wherein:

said shield is in the form of a metallic sheet.

* * * * *